United States Patent
Ellis et al.

(10) Patent No.: US 10,884,917 B2
(45) Date of Patent: Jan. 5, 2021

(54) DUAL MEDIA PACKAGING TARGETED FOR SSD USAGE

(71) Applicant: Western Digital Technologies, Inc., San Jose, CA (US)

(72) Inventors: Robert W. Ellis, Phoenix, AZ (US); Stephen Gold, Fort Collins, CO (US)

(73) Assignee: WESTERN DIGITAL TECHNOLOGIES, INC, San Jose, CA (US)

(*) Notice: Subject to any disclaimer, the term of this patent is extended or adjusted under 35 U.S.C. 154(b) by 75 days.

(21) Appl. No.: 16/211,033

(22) Filed: Dec. 5, 2018

(65) Prior Publication Data

US 2020/0183825 A1    Jun. 11, 2020

(51) Int. Cl.
G06F 12/02    (2006.01)
G06F 12/06    (2006.01)
G06F 3/06    (2006.01)

(52) U.S. Cl.
CPC ........ *G06F 12/0246* (2013.01); *G06F 3/0629* (2013.01); *G06F 12/0646* (2013.01); *G06F 2212/7201* (2013.01)

(58) Field of Classification Search
CPC .............. G06F 12/0246; G06F 3/0629; G06F 12/0646; G06F 2212/7201
See application file for complete search history.

(56) References Cited

U.S. PATENT DOCUMENTS

| | | | | |
|---|---|---|---|---|
| 2010/0332846 | A1* | 12/2010 | Bowden | G06F 16/9017 713/189 |
| 2012/0193785 | A1* | 8/2012 | Lin | H01L 21/76229 257/737 |
| 2012/0324156 | A1* | 12/2012 | Muralimanohar | G06F 11/1044 711/104 |
| 2014/0143508 | A1* | 5/2014 | Kwon | G06F 3/0683 711/147 |
| 2016/0202910 | A1* | 7/2016 | Ravimohan | G06F 12/0607 711/103 |
| 2017/0102971 | A1* | 4/2017 | Blagodurov | G06F 9/5044 |
| 2017/0294375 | A1* | 10/2017 | Terada | H01L 51/05 |
| 2019/0102253 | A1* | 4/2019 | Televitckiy | G06F 3/0688 |
| 2019/0123024 | A1* | 4/2019 | Teig | H01L 25/0657 |

* cited by examiner

*Primary Examiner* — Masud K Khan
(74) *Attorney, Agent, or Firm* — Patterson & Sheridan, LLP; Steven H. Versteeg

(57) ABSTRACT

The present disclosure generally relates to data storage devices comprising one or more memory packages. At least one memory package of the storage device comprises a first stack of memory dies coupled together by a first chip select line and a second stack of memory dies coupled together by a second chip select line. Both the first stack and the second stack comprise a plurality of non-volatile memory dies and a dissimilar memory die disposed on top of the plurality of non-volatile memory dies. Within both the first stack and the second stack, the plurality of non-volatile memory dies is a different type of memory than the dissimilar memory die. Additionally, within both the first stack and the second stack, the plurality of non-volatile memory dies is configured to store host data, and the dissimilar memory die is configured to store cached data.

20 Claims, 2 Drawing Sheets

DUAL MEDIA PACKAGING TARGETED FOR SSD USAGE

BACKGROUND OF THE DISCLOSURE

Field of the Disclosure

Embodiments of the present disclosure generally relate to storage devices, such as solid state drives (SSDs).

Description of the Related Art

The capacity of memory arrangements in data storage devices, such as SSDs, is constantly being improved as technology increases. Throughput of memory arrangements is also required to be increased as ever increasing processing speeds require data to be supplied at high rates of speed. In order to meet these needs, manufacturers of storage devices seek cost effective ways to increase both storage capacity and data throughput for their devices. However, while it is desirable to increase the storage capacity of memory arrangements, it is undesirable to increase the size of the storage device to compensate for the increased capacity.

An increased storage capacity may require a larger amount of dynamic random access memory (DRAM), which may be used to store logical-to-physical (L2P) tables and cached data for the device. However, DRAM can be expensive, and a larger amount of DRAM would require a greater amount of space to fit on the already-limited printed circuit board (PCB). Thus, both the cost and the size of the device may be increased to compensate for the larger DRAM. Additionally, utilizing a bigger DRAM may increase the requirements of the controllers of the device and cause decreased throughput, as the controllers would need to support a greater linear address space in order to communicate with the larger DRAM.

Thus, what is needed is a storage device having an increased storage capacity and data throughput without increasing costs or the overall size of the device.

SUMMARY OF THE DISCLOSURE

The present disclosure generally relates to data storage devices comprising one or more memory packages. At least one memory package of the storage device comprises a first stack of memory dies coupled together by a first chip select line and a second stack of memory dies coupled together by a second chip select line. Both the first stack and the second stack comprise a plurality of non-volatile memory dies and a dissimilar memory die disposed on top of the plurality of non-volatile memory dies. Within both the first stack and the second stack, the plurality of non-volatile memory dies is a different type of memory than the dissimilar memory die. Additionally, within both the first stack and the second stack, the plurality of non-volatile memory dies is configured to store host data, and the dissimilar memory die is configured to store cached data.

In one embodiment, a storage device comprises a controller and a memory package coupled to the controller. The memory package comprises a first stack of memory dies. The first stack of memory dies comprises a first plurality of non-volatile memory dies. The memory package further comprises a first dissimilar memory die disposed on top of the first stack of memory dies. The first dissimilar memory die is a different type of memory than the first plurality of non-volatile memory dies. The first dissimilar memory die is coupled to the first plurality of non-volatile memory dies by a first chip select line.

In another embodiment, a memory package comprises a first stack of memory dies. The first stack of memory dies comprises a first plurality of non-volatile memory dies. The memory package further comprises a first dissimilar memory die disposed on top of the first stack of memory dies. The first dissimilar memory die is a different type of memory than the first plurality of non-volatile memory dies. The memory package further comprises a first chip select line coupled to the first dissimilar memory die and the first plurality of non-volatile memory dies and a second stack of memory dies disposed adjacent to the first stack of memory dies. The second stack of memory dies comprises a second plurality of non-volatile memory dies. The memory package further comprises a second dissimilar memory die disposed on top of the second stack of memory dies. The second dissimilar memory die is a different type of memory than the second plurality of non-volatile memory dies. The memory package further comprises a second chip select line coupled to the second dissimilar memory die and the second plurality of non-volatile memory dies.

In another embodiment, a storage device comprises a controller and a memory package coupled to the controller. The memory package comprises a first plurality of non-volatile memory dies, a first dissimilar memory die disposed on top of the first plurality of non-volatile memory dies, and a second plurality of non-volatile memory dies. The first plurality of non-volatile memory dies and the second plurality of non-volatile memory dies comprise a first type of memory. The first plurality of non-volatile memory dies and the second plurality of non-volatile memory dies are configured to store host data. The memory package further comprises a second dissimilar memory die disposed on top of the second plurality of non-volatile memory dies. The first dissimilar memory die and the second dissimilar memory die comprise a second type of memory. The second type of memory is different than the first type of memory. The first dissimilar memory die and the second dissimilar memory die are configured to store cached data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices comprising one or more memory packages. At least one memory package of the storage device comprises a first stack of memory dies coupled together by a first chip select line and a second stack of memory dies coupled together by a second chip select line. Both the first stack and the second stack comprise a plurality of non-volatile memory dies and a dissimilar memory die disposed on top of the plurality of non-volatile memory dies. Within both the first stack and the second stack, the plurality of non-volatile memory dies is a different type of memory than the dissimilar memory die. Additionally, within both the first stack and the second stack, the plurality of non-volatile memory dies is configured to store host data, and the dissimilar memory die is configured to store cached data.

Figure 1:
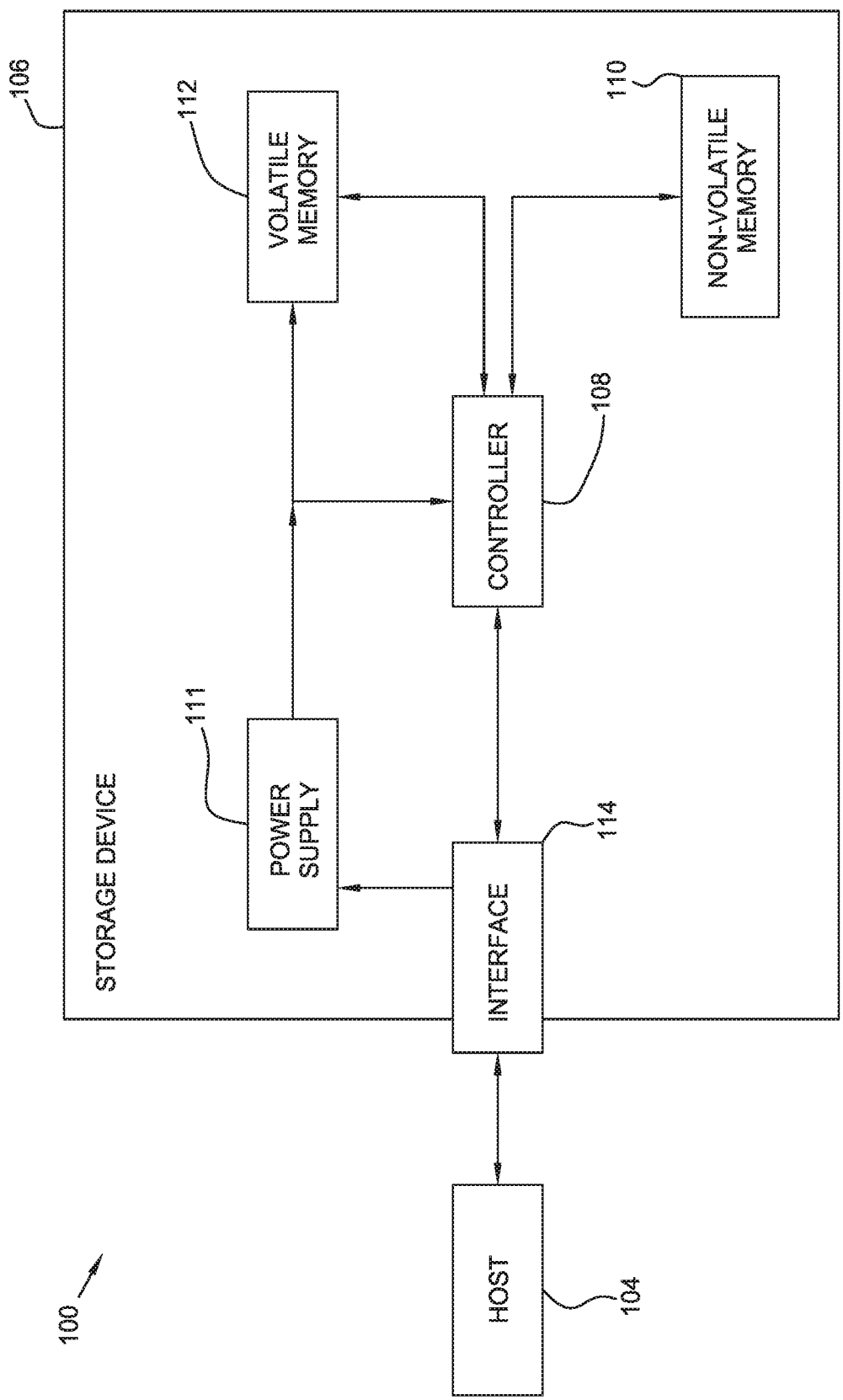
FIG. 1 is a conceptual and schematic block diagram illustrating a storage system comprising a data storage device coupled to a host device, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize non-volatile memory devices included in storage device 106 to store and retrieve data. In some examples, the storage system 100 may include a plurality of storage devices, such as the storage device 106, which may operate as a storage array. For instance, the storage system 100 may include a plurality of storages devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1, the storage device 106 includes a controller 108, non-volatile memory (NVM) 110, a power supply 111, volatile memory 112, and an interface 114. In some examples, the storage device 106 may include additional components not shown in FIG. 1 for sake of clarity. For example, the storage device 106 may include a printed board (PB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices. NVM 110 may be configured to store and/or retrieve data. For instance, a memory device of NVM 110 may receive data and a message from the controller 108 that instructs the memory device to store the data. Similarly, the memory device of NVM 110 may receive a message from the controller 108 that instructs the memory device to retrieve data. In some examples, each of the memory devices may be referred to as a die. In some examples, a single physical chip may include a plurality of dies (i.e., a plurality of memory devices). In some examples, each memory devices may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory device of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

NVM 110 may comprise a plurality of flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC).

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The storage device 106 includes a controller 108, which may manage one or more operations of the storage device 106. For instance, the controller 108 may manage the reading of data from and/or the writing of data to NVM 110. In some embodiments, when the storage device 106 receives a write command from the host device 104, the controller 108 may initiate a data storage command to store data to NVM 110 and monitor the progress of the data storage command. The controller 108 may determine at least one operational characteristic of the storage system 100 and store the at least one operational characteristic to NVM 110.

Figure 2:
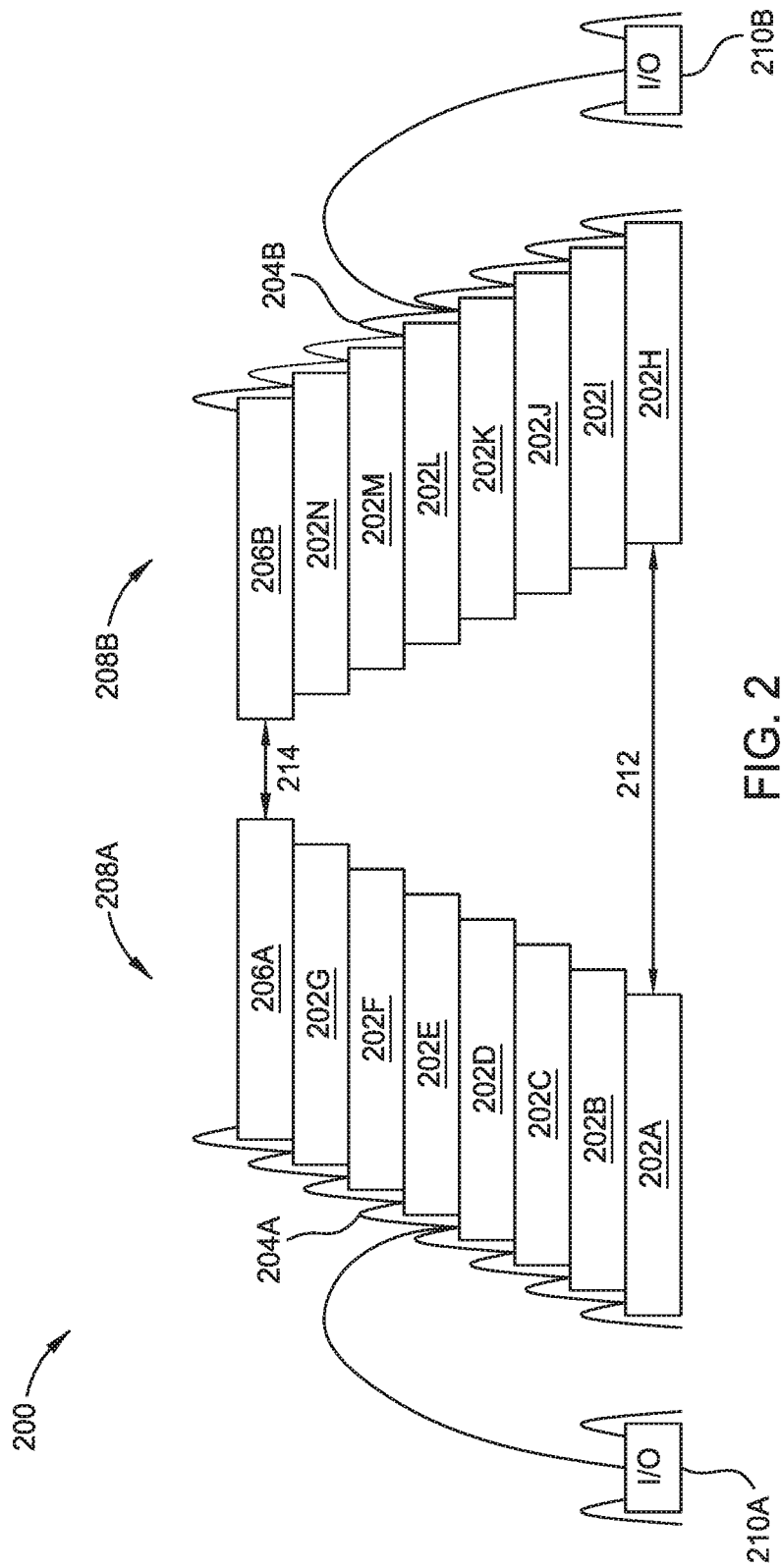
FIG. 2 illustrates an exemplary memory package used in a data storage device, according to one embodiment.

FIG. 2 illustrates an exemplary memory package 200 used in a data storage device, according to one embodiment. The memory package 200 of FIG. 2 is one embodiment only, and is not intended to be limiting. The memory package 200 may be stored within the NVM 110 of the storage device 106 of FIG. 1. Furthermore, one or more memory packages 200 may be disposed on a PCB and used in a storage device.

The memory package 200 comprises a plurality of memory dies 202A-202N, 206A-206B disposed on one or more chip select lines 204A-204B to form stacks 208A-208B. The plurality of memory dies 202A-202N, 206A-206B includes a plurality of NVM dies 202A-202N and one or more dissimilar memory dies 206A-206B. In one embodiment, the plurality of NVM dies 202A-202N are NAND dies. Each stack 208A-208B is coupled to an input/output (I/O) pad 210A-210B. Each memory die 202A-202N, 206A-206B within the stacks 208A-208B has the same bus and interface.

In the memory package 200 of FIG. 2, each stack 208A-208B comprises eight memory dies 202A-202N, 206A-206B coupled to one or more chip select lines 204A-204B, resulting in a total of 16 memory dies 202A-202N, 206A-206B. Specifically, two chip select lines 204A-204B, fourteen NVM dies 202A-202B, and two dissimilar memory dies 206A-206B are illustrated in FIG. 2. However, the memory package 200 is not limited to only two chip select lines, and may comprise any number of chip select lines. For example, a separate chip select line may be coupled to each of the dissimilar memory dies 206A-206B. Furthermore, the memory package 200 is not limited to fourteen NVM dies 202A-202N, and may comprise any number of NVM dies 202A-202N. In one embodiment, one to eight NVM dies 202A-202N may be disposed on each chip select line 204A-204B for a total of two to sixteen NVM dies 202A-202N disposed within the memory package 200. The memory package 200 is not limited to two dissimilar memory dies 206A-206B, and may comprise one or more dissimilar dies 206A-206B per memory package.

In the embodiment shown in FIG. 2, each chip select line 204A-204B has seven NVM dies 202A-202N disposed thereon. The seven NVM dies 202A-202N are stacked on top of one another, forming two stacks 208A-208B of memory dies. All of the NVM dies 202A-202N are the same type of memory, such as NAND memory. The NVM dies 202A-202N may be MLC, TLC, and/or QLC dies. Each chip select line 204A-204B further has one dissimilar memory die 206A-206B disposed thereon, on top of the NVM dies 202A-202N. Each dissimilar memory die 206A-206B may be coupled to a second, separate chip select line (not shown). A dissimilar memory die 206A-206B may be added to an already existing stack of NVM dies 202A-202N within a memory package. In one embodiment, regardless of the number of NVM dies 202A-202N disposed on the stacks 208A-208B, the stacks 208A-208B comprise only one dissimilar memory die 206A-206B disposed at the top.

The plurality of memory dies 202A-202N, 206A-206B may be stacked in a stair-like manner such that the stacks 208A, 208B are incrementally offset. In one embodiment, the stair-like structure is along the plane of the PCB. In another embodiment, the stacks 208A, 208B extend vertically out of the PCB. In yet another embodiment, the plurality of memory dies 202A-202G, 206A of stack 208A and the plurality of memory dies 202H-202N, 206B of stack 208B are horizontally offset from one another such that the stacks 208A, 208B vertically extend towards one another. For example, a first NVM die 202A of stack 208A and a first NVM die 202H of stack 208B are coupled to the PCB (i.e. the bottom of the stacks), and are disposed a first distance 212 apart from one another. The dissimilar memory die 206A of stack 208A and the dissimilar memory die 206B of stack 208B are disposed furthest from the PCB (i.e. the top of the stacks), and are disposed a second distance 214 from one another. The first distance 212 is greater than the second distance 214. Thus, the dissimilar memory die 206A of stack 208A and the dissimilar memory die 206B of stack 208B are disposed closest to one another, and the first NVM die 202A of stack 208A and the first NVM die 202H of stack 208B are disposed furthest apart from one another.

It is contemplated that the location of the dissimilar memory die 206A-206B may be disposed at any location with the stacks 208A-208B. Additionally, each stack 208A, 208B may have a different, dissimilar memory die 206A, 206B. Thus, not only is it contemplated that the dissimilar memory die 206A, 206B be different from the NVM dies 202A-202N within a given stack, but the dissimilar memory die 206A, 206B in different stacks 208A, 208B may be different. Furthermore, it is contemplated that the location of the dissimilar memory die 206A, 206B may be different in different stacks 208A, 208B. Thus, it is contemplated that the given stack 208A, 208B may have identical or different dissimilar memory dies 206A, 206B, and the identical or different dissimilar memory die 206A, 206B may be disposed in a different location within the given stack 208A, 208B.

In one embodiment, the dissimilar memory dies 206A-206B are the same type of memory. The dissimilar memory dies 206A-206B and the plurality of NVM dies 202A-202B are different memory types. The dissimilar memory dies 206A-206B may be SLC dies, fast NAND dies, or MRAM dies, among others. The dissimilar memory dies 206A-206B are not limited to being any specific type of memory. In one embodiment, the dissimilar memory dies 206A-206B have the same or similar programmatic and hardware interface as the NVM dies 202A-202N. Stacking the dissimilar memory dies 206A-206B on top of the NVM dies 202A-202N reduces the amount of space needed or being utilized on a PCB.

In one embodiment, the dissimilar memory dies 206A-206B are fast NAND dies. Fast NAND dies may operate in an SLC mode, and may have a reduced page size and an increased number of planes to lower the die collision rate. The page size of the fast NAND dies may be smaller than the page size of each of the NVM dies 202A-202N. In one embodiment, the page size of the fast NAND dies is smaller than a page size of a NAND die. Fast NAND dies may further have reduced program and read sense times. Fast NAND dies are a faster type of memory than NAND, and are considered a different memory type than NAND for purposes of this disclosure.

The dissimilar memory dies 206A-206B may store different types of data than the NVM dies 202A-202N. The NVM dies 202A-202N may store customer and host data while the dissimilar memory dies 206A-206B may be used for data caching purposes, such as where SLC dies or DRAM are generally used. Such data caching purposes may include storing L2P tables, host data write caching, parity data, power fail data, error logs, transaction logs, other tracking log files, short-term data storage, and/or specific types of data, such as hot data or cold data, among others. In one embodiment, the dissimilar memory die 206A-206B of each stack 208A-208B is used for data caching purposes for all of the NVM dies 202A-202N disposed below the respective dissimilar memory die 206A-206B. For example, the dissimilar memory die 206A may be used for data caching purposes for the NVM dies 202A-202G in the stack 208A while the memory die 206B may be used for data caching purposes for the NVM dies 202H-202N in the stack 208B.

Several benefits may be achieved when the dissimilar memory dies 206A-206B are used for data caching purposes. For example, utilizing the dissimilar memory dies 206A-206B to store an L2P table allows L2P lookups to be completed quicker than in an L2P table stored in NVM dies 202A-202N where host data is stored (i.e. the main memory comprising MLC, TLC, and/or QLC dies). As such, the latency for internal and external read/write commands is reduced and the data throughput is increased. Furthermore, utilizing the dissimilar memory dies 206A-206B for data caching purposes allows the cached data to be offloaded from the NVM dies 202A-202N storing customer data.

Offloading the cached data from the NVM dies 202A-202B results in additional overprovisioning (OP) capacity being available. This lowers the write amplification factor (WAF) of the storage device, which increases the overall endurance and provides for faster random write performance speeds. Since additional OP capacity is available, the granularity or partition of L2P table reads and writes may be increased, as the dissimilar memory dies 206A-206B have increased endurance able to support a larger L2P table WAF. The increased granularity or partition of the L2P table allows storage device boot times to be improved. Furthermore, Toggle Mode (TM) bus bandwidth and power may be utilized more efficiently, as the amount of data transferred over the TM bus may be reduced.

By adding a dissimilar memory die 206A-206B to a stack of NVM dies 202A-202N, additional PCB space is not required, and the overall amount of PCB space being utilized may be reduced or remain the same. Storage capacity is further increased, as the NVM dies 202A-202N are no longer required to be dual use (e.g., both MLC and SLC), and the need to set aside a portion of the NVM dies 202A-202N for SLC use is eliminated. Additionally, the addition of the dissimilar memory dies 206A-206B allows the firmware to be smaller and simplified. Since both types of memory dies 202A-202N, 206A-206B are disposed within the same memory package 200, all other signals coupled to the memory package 200 can be connected in parallel, such as the data bus, read enable (RE), write enable (WE), address latch enable (ALE), and/or command latch enable (CLE) signals. As such, the number of connections between the controller and the memory package 200 is reduced. Moreover, the quality of service of the memory package 200 is improved over memory packages having standard data caching approaches, as SLC data caching is enhanced and a lower L2P table lookup latency is achieved by utilizing the dissimilar memory dies 206A-206B with the NVM dies 202A-202B.

In one embodiment, a storage device comprises a controller and a memory package coupled to the controller. The memory package comprises a first stack of memory dies. The first stack of memory dies comprises a first plurality of non-volatile memory dies. The memory package further comprises a first dissimilar memory die disposed on top of the first stack of memory dies. The first dissimilar memory die is a different type of memory than the first plurality of non-volatile memory dies. The first dissimilar memory die is coupled to the first plurality of non-volatile memory dies by a first chip select line.

Each non-volatile memory die of the plurality of non-volatile memory dies may be a NAND memory die. Each non-volatile memory die of the first plurality of non-volatile memory dies may be a multi-level cell die, a tri-level cell die, or a quad-level cell die. The first dissimilar memory die may be a fast NAND die. The first dissimilar memory die may be operated in a single level cell mode. The first dissimilar memory die may have a smaller page size than each non-volatile memory die of the plurality of non-volatile memory dies. The first dissimilar memory die may be a magnetic random access memory die.

In another embodiment, a memory package comprises a first stack of memory dies. The first stack of memory dies comprises a first plurality of non-volatile memory dies. The memory package further comprises a first dissimilar memory die disposed on top of the first stack of memory dies. The first dissimilar memory die is a different type of memory than the first plurality of non-volatile memory dies. The memory package further comprises a first chip select line coupled to the first dissimilar memory die and the first plurality of non-volatile memory dies and a second stack of memory dies disposed adjacent to the first stack of memory dies. The second stack of memory dies comprises a second plurality of non-volatile memory dies. The memory package further comprises a second dissimilar memory die disposed on top of the second stack of memory dies. The second dissimilar memory die is a different type of memory than the second plurality of non-volatile memory dies. The memory package further comprises a second chip select line coupled to the second dissimilar memory die and the second plurality of non-volatile memory dies.

The first stack of memory dies may be coupled to a first input/output pad. The second stack of memory dies may be coupled to a second input/output pad. The first plurality of non-volatile memory dies may be horizontally offset in the first stack of memory dies, and the second plurality of non-volatile memory dies may be horizontally offset in the second stack of memory dies. The first stack of memory dies and the second stack of memory dies may comprise the same number and type of memory dies. The first plurality of non-volatile memory dies and the second plurality of non-volatile memory dies may each comprise seven non-volatile memory dies. The first dissimilar memory die and the second dissimilar memory die may be the same type of memory die.

In another embodiment, a storage device comprises a controller and a memory package coupled to the controller. The memory package comprises a first plurality of non-volatile memory dies, a first dissimilar memory die disposed on top of the first plurality of non-volatile memory dies, and a second plurality of non-volatile memory dies. The first plurality of non-volatile memory dies and the second plurality of non-volatile memory dies comprise a first type of memory. The first plurality of non-volatile memory dies and the second plurality of non-volatile memory dies are configured to store host data. The memory package further comprises a second dissimilar memory die disposed on top of the second plurality of non-volatile memory dies. The first dissimilar memory die and the second dissimilar memory die comprise a second type of memory. The second type of memory is different than the first type of memory. The first dissimilar memory die and the second dissimilar memory die are configured to store cached data.

The first dissimilar memory die may store a first logical to physical table for the first plurality of non-volatile memory dies. The second dissimilar memory die may store a second logical to physical table for the second plurality of non-volatile memory dies. The first dissimilar memory die and the second dissimilar memory die may be configured to store parity data. The first dissimilar memory die and the second dissimilar memory die may be configured to store power fail data. The first type of memory may be NAND memory, and the second type of memory may be fast NAND memory operating in a single level cell mode.

While the foregoing is directed to embodiments of the present disclosure, other and further embodiments of the disclosure may be devised without departing from the basic scope thereof, and the scope thereof is determined by the claims that follow.

What is claimed is:
1. A storage device, comprising:
a controller; and
a memory package coupled to the controller, the memory package comprising:
a first stack of memory dies, the first stack of memory dies comprising a first plurality of non-volatile memory dies; and
a first dissimilar memory die disposed on top of the first stack of memory dies, the first dissimilar memory die being a different type of memory than the first plurality of non-volatile memory dies, wherein the first dissimilar memory die is coupled to the first plurality of non-volatile memory dies by a first chip select line, wherein the first dissimilar memory die has a smaller page size than each non-volatile memory die of the first plurality of non-volatile memory dies, and wherein the first dissimilar memory die is configured to store a logical to physical table for the first plurality of non-volatile memory dies, parity data, or power fail data.

2. The storage device of claim 1, wherein each non-volatile memory die of the first plurality of non-volatile memory dies is a NAND memory die.

3. The storage device of claim 2, wherein each non-volatile memory die of the first plurality of non-volatile memory dies is a multi-level cell die, a tri-level cell die, or a quad-level cell die.

4. The storage device of claim 1, wherein the first dissimilar memory die is a fast NAND die.

5. The storage device of claim 4, wherein the first dissimilar memory die is operated in a single level cell mode.

6. The storage device of claim 1, wherein the first dissimilar memory die is a magnetic random access memory die.

7. A memory package, comprising:
a first stack of memory dies, the first stack of memory dies comprising a first plurality of non-volatile memory dies;
a first dissimilar memory die disposed on top of the first stack of memory dies, the first dissimilar memory die being a different type of memory than the first plurality of non-volatile memory dies, wherein the first dissimilar memory die has a smaller page size than each non-volatile memory die of the first plurality of non-volatile memory dies, and wherein the first dissimilar memory die is configured to store a first logical to physical table for the first plurality of non-volatile memory dies, parity data, or power fail data;
a first chip select line coupled to the first dissimilar memory die and the first plurality of non-volatile memory dies;
a second stack of memory dies disposed adjacent to the first stack of memory dies, the second stack of memory dies comprising a second plurality of non-volatile memory dies;
a second dissimilar memory die disposed on top of the second stack of memory dies, the second dissimilar memory die being a different type of memory than the second plurality of non-volatile memory dies; and
a second chip select line coupled to the second dissimilar memory die and the second plurality of non-volatile memory dies.

8. The memory package of claim 7, wherein the first stack of memory dies is coupled to a first input/output pad.

9. The memory package of claim 7, wherein the second stack of memory dies is coupled to a second input/output pad.

10. The memory package of claim 7, wherein the first plurality of non-volatile memory dies are horizontally offset in the first stack of memory dies, and wherein the second plurality of non-volatile memory dies are horizontally offset in the second stack of memory dies.

11. The memory package of claim 7, wherein the first stack of memory dies and the second stack of memory dies comprise the same number and type of memory dies.

12. The memory package of claim 11, wherein the first plurality of non-volatile memory dies and the second plurality of non-volatile memory dies each comprise seven non-volatile memory dies.

13. The memory package of claim 7, wherein the first dissimilar memory die and the second dissimilar memory die are the same type of memory die.

14. The storage device of claim 7, wherein the second dissimilar memory die is configured to store a second logical to physical table for the second plurality of non-volatile memory dies, parity data, or power fail data.

15. A storage device, comprising:
    a controller; and
    a memory package coupled to the controller, the memory package comprising:
        a first plurality of non-volatile memory dies;
        a first dissimilar memory die disposed on top of the first plurality of non-volatile memory dies, wherein the first dissimilar memory die has a smaller page size than each non-volatile memory die of the first plurality of non-volatile memory dies;
        a second plurality of non-volatile memory dies, wherein the first plurality of non-volatile memory dies and the second plurality of non-volatile memory dies comprise a first type of memory, and wherein the first plurality of non-volatile memory dies and the second plurality of non-volatile memory dies are configured to store host data; and
        a second dissimilar memory die disposed on top of the second plurality of non-volatile memory dies, wherein the first dissimilar memory die and the second dissimilar memory die comprise a second type of memory, the second type of memory being different than the first type of memory, and wherein the first dissimilar memory die is configured to store a first logical to physical table for the first plurality of non-volatile memory dies, parity data, cached data, or power fail data and the second dissimilar memory die is configured to store a second logical to physical table for the second plurality of non-volatile memory dies, parity data, cached data, or power fail data.

16. The storage device of claim 15, wherein the first dissimilar memory die stores a first logical to physical table for the first plurality of non-volatile memory dies.

17. The storage device of claim 15, wherein the second dissimilar memory die stores a second logical to physical table for the second plurality of non-volatile memory dies.

18. The storage device of claim 15, wherein the first dissimilar memory die and the second dissimilar memory die are configured to store parity data.

19. The storage device of claim 15, wherein the first dissimilar memory die and the second dissimilar memory die are configured to store power fail data.

20. The storage device of claim 15, wherein the first type of memory is NAND memory, and wherein the second type of memory is fast NAND memory operating in a single level cell mode.

\* \* \* \* \*